(12) United States Patent
Dickey

(10) Patent No.: US 6,816,709 B2
(45) Date of Patent: Nov. 9, 2004

(54) METHOD AND APPARATUS FOR TESTING CDMA SIGNAL PROPAGATION AND COVERAGE

(75) Inventor: Sergey L. Dickey, Fairfax, VA (US)

(73) Assignee: PCTel Maryland, Inc., Chicago, IL (US)

(*) Notice: Subject to any disclaimer, the term of this patent is extended or adjusted under 35 U.S.C. 154(b) by 501 days.

(21) Appl. No.: 09/932,118

(22) Filed: Aug. 17, 2001

(65) Prior Publication Data

US 2002/0022484 A1 Feb. 21, 2002

Related U.S. Application Data

(60) Provisional application No. 60/226,542, filed on Aug. 19, 2000.

(51) Int. Cl.[7] ............................................. H04B 17/00
(52) U.S. Cl. ................................ 455/67.16; 455/67.13
(58) Field of Search .......................... 455/67.16, 115.1, 455/226.3, 522, 67.11, 67.13, 69; 370/335, 342, 252; 375/227

(56) References Cited

U.S. PATENT DOCUMENTS

| | | | |
|---|---|---|---|
| 5,596,570 A | 1/1997 | Soliman | ..................... 370/252 |
| 5,675,581 A | 10/1997 | Soliman | ..................... 370/252 |
| 5,758,271 A | 5/1998 | Rich et al. | ................ 455/234.1 |
| 6,023,615 A | 2/2000 | Bruckert et al. | .......... 455/277.2 |
| 6,070,086 A | 5/2000 | Dobrica | ....................... 455/252 |
| 6,430,237 B1 * | 8/2002 | Anvari | ........................ 375/343 |
| 6,438,362 B1 * | 8/2002 | Amezawa | ................ 455/226.3 |
| 6,456,653 B1 * | 9/2002 | Sayeed | ......................... 375/227 |
| 6,532,252 B1 * | 3/2003 | Moon et al. | ................. 375/144 |
| 6,717,976 B1 * | 4/2004 | Shen | ........................... 375/147 |

* cited by examiner

Primary Examiner—Nay Maung
Assistant Examiner—Bryan Fox
(74) Attorney, Agent, or Firm—Roberts Abokhair & Mardula LLC

(57) ABSTRACT

A method and apparatus tests CDMA signal propagation and coverage. A pn scan is first made of the pilot channel to be measured. The signal to total power ratio, Ec/Io is calculated. A frequency scan is made of the reception frequency close in time to the pn scan. The frequency scan results are used to identify and quantify any interference adjacent and coincident with the CDMA channel of interest. The power of the interfering transmissions are weighted, interfering signals with frequencies close or within the CDMA channel of interest are given heavier weights. Removing weighted value of the interfering signals modifies and reduces the value of Io. An adjusted Ec/Io is calculated to reflect the modified Io value, thus resulting in an approximation of the Ec/Io value at the transmission site. The sources of interference can be reported to the CDMA carrier for remedial attention.

34 Claims, 1 Drawing Sheet

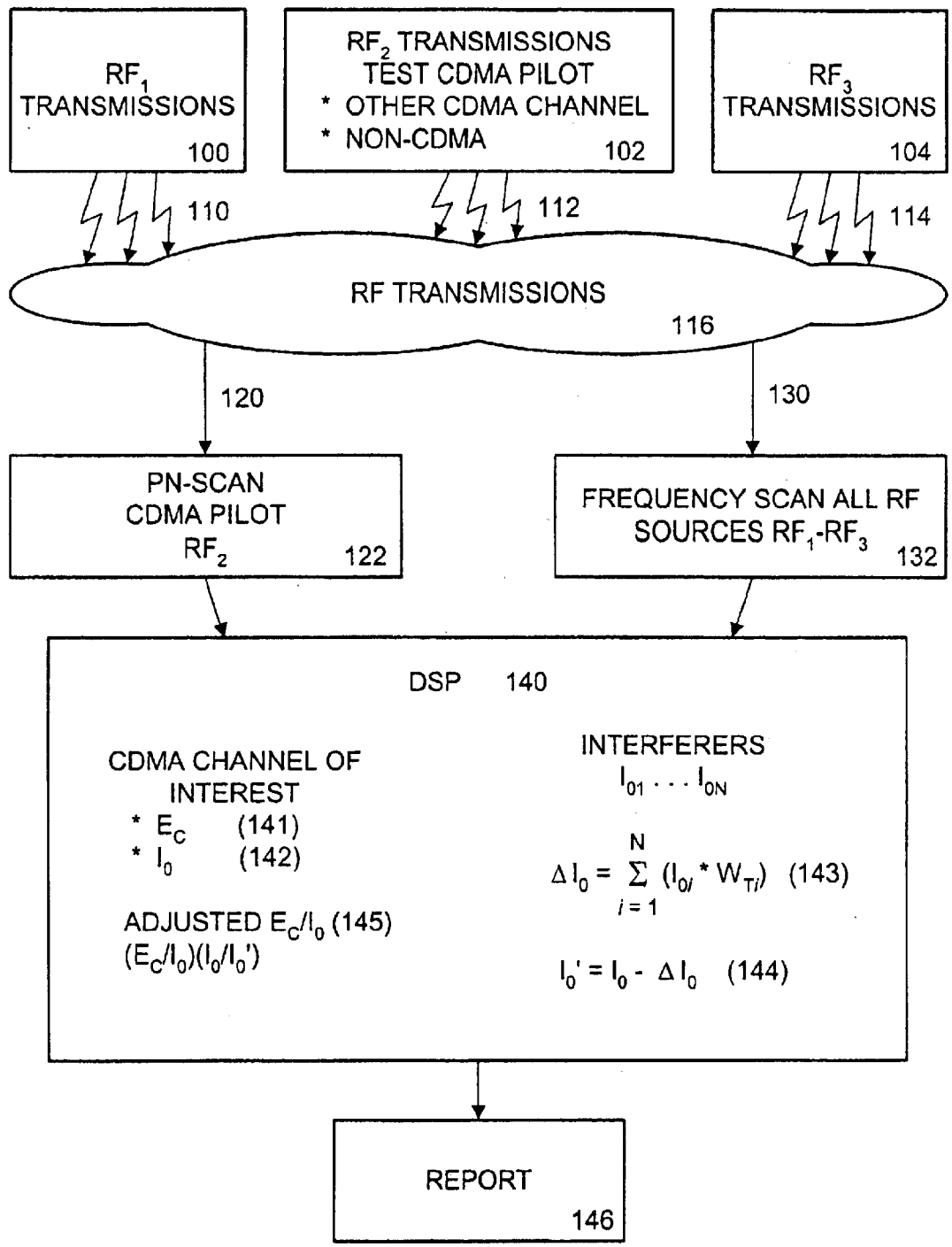
FIGURE

METHOD AND APPARATUS FOR TESTING CDMA SIGNAL PROPAGATION AND COVERAGE

CROSS REFERENCE TO RELATED APPLICATIONS

This application claims priority under 35 U.S.C. §119 (e) from provisional application No. 60/226,542, filed Aug. 19, 2000. The No. 60/226,542 application is incorporated by reference herein, in its entirety, for all purposes.

FIELD OF INVENTION

The present invention relates to radio communication systems including CDMA cellular and PCS telephone networks, and in particular, to a method and apparatus for testing such networks with the measurement results corrected for the distortions caused by interference from adjacent and coincident channel emissions and other interference.

BACKGROUND OF THE INVENTION

CDMA cellular and PCS telephone networks are a type of mobile communication network that use pseudo noise digital codes ("pn-codes"). Pn-codes spread the transmitting signals' spectrum so that multiple communications can occur over the same broadband transmission. Multiplexing and demultiplexing a particular communication signal within the common frequency allows multiple many communications to occur simultaneously.

Testing devices, including pn-scanners, assess the adequacy of signal coverage within a service area for cellular and PCS network. These devices also measure the quality of the CDMA signals from a base station. One measurement device is the pilot scan, measured at a reception site.

The pilot scan provides a graph of base station pilot signal's strength relative to the initial sequence offset. The mathematical representation is Ec/Io where Ec (energy per chip) is the relative strength of the signal relevant to the communication and Io is the power of the entire transmission signal within the bandwidth. This Ec/Io measurement is in decibels.

The pn-scan measures the quality of the signal received as indicated by its relative composition (how strong is the pilot component in reference to other code components, such as paging, synchronization, and traffic channels) and by modulation and synchronization quality. For example, if the base station Ec/Io measurement deviates from the recommended standards (EIA/TIA IS-97 for the US), or if the carrier is not sufficiently stable, the result will show a value of Ec/Io that is outside the recommended value.

One can distinguish between two measurement goals, which may exist simultaneously, or one at a time: 1) to assess the quality of the signal received at the test site from the standpoint of its fitness for good communication; and 2) to assess the correctness of the transmitter adjustment and modulation quality. Deviation beyond a quality limit alerts the tester to a potential problem that may be caused by a propagation obstacle or by equipment problems at the cell site.

Interference caused by emissions of CDMA (spread-spectrum) and discrete FDMA signals at adjacent and coincident-channel frequencies, as well as in-band, will distort the measurement results. The distortion will be caused in most cases by the increased overall power in the bandwidth of the measurement instrument. This increase of the Io value will in its turn cause a commensurate decrease in the Ec/Io value. Although this decreased value of the received Ec/Io may correctly reflect the reception conditions in the service area in many cases, it does little to help identify the sources of the problem or to verify the correctness of the base station operation.

Various methods for testing in a code division multiple access (CDMA) spread spectrum environment have been the subject of invention. For example, it has been proposed to creating simulated signal interference in a communication channel within a communication system and estimating the average data rates for composite signal energy. For details, refer to U.S. Pat. No. 5,596,570 issued to Soliman for a "System And Method For Simulating Interference Received By Subscriber Units In A Spread Spectrum Communication Network." Another technique for simulating signal interference for various testing purposes is discussed in U.S. Pat. No. 5,675,581 issued to Soliman for a "Simulating User Interference In A Spread Spectrum Communication Network."

It has been proposed to optimize the quality of a received signal in a radio receiver by using a novel gain controller for adjusting the gain of the radio receiver to enhance quality. For details, refer to U.S. Pat. No. 5,758,271 issued to Rich et al. for an "Apparatus And Method For Optimizing The Quality Of A Received Signal In A Radio Receiver."

A method has been described for establishing a radio subscriber unit including switched antennas in controlling a diversity receiver apparatus in a radio subscriber unit. The system receives a signal line comprising an Ec-Io ratio and determines if a predetermined threshold, which is set to maintain a desired frame error rate, is achieved. Thus quality in the form of the Ec-Io ratio is monitored in the invention. For details, refer to U.S. Pat. No. 6,023,615 issued to Bruckert et al. for a "Method for controlling a diversity receiver apparatus in a radio subscriber unit."

It has been proposed to calculate signal power using remodulation based upon provided carrier signals. A calculation for interference power uses a difference between a received signal and remodulated signal. Depending upon the results of measurements, power may be controlled to the system. For details, refer to U.S. Pat. No. 6,070,086 issued to Dobrica for a "Closed Loop Power Transmitter Power Control Unit For A CDMA Cellular System."

Other devices such as the SeeGull™ (available from Dynamic Telecommunications, Inc. of Germantown, Md.) also comprise a pn-scanner suited for micro cell analysis.

What is needed is a method and apparatus to modify the Ec/Io readings such that interferences from adjacent and coincident with the CDMA channel of interest can be removed from the measurements. This would allow the tester to obtain a reliable approximation of the base station's transmission Ec/Io.

SUMMARY OF THE INVENTION

It is an object of the present invention to provide a simple method and apparatus for testing CDMA signal propagation and coverage.

It is another object of the present invention to provide a method and apparatus for calculating a corrected CDMA transmission signal to power that approximates the Ec/Io value of the CDMA transmission at the site of the transmitter.

These and other objectives of the present invention will become apparent to those skilled in the art from a review of the specification that follows.

A pn-scanner does a pilot scan of the CDMA channel of interest. The scan tests and measures energy per chip (Ec) and the total amount of power (Io). The ratio Ec/Io is an indicator of the quality and propagation of the signal. The present invention tests to see if an unacceptable Ec/Io ratio is due to interference from other transmissions within or close to the same transmission RF. A frequency scan performed close in time to the pn-scan is used to identify transmission signals that add strength to the Io value.

One embodiment of the present invention uses spectrum measurements on the signal received by the frequency scanner. Taking spectrum measurements and using pattern recognition analysis provides identification of discrete interference sources.

Interference component information including magnitude of the power, the transmission frequency and the type of signal is sent to a processor. In one embodiment, the processor is a digital signal processor (DSP), which may be integrated with either or both scanners. The present invention analyzes this information to adjust the Ec/Io for interference.

Depending on the kind and frequency offset from the nominal receive frequency of the identified spectral components, the individual interference items are treated in different ways to obtain the correcting factor for the value of the total power (Io) of the received signal. The goal is to correct the value of Io to obtain the value that characterizes only the power of the useful spread-spectrum signal exclusive of the interference power identified.

The processor computes a delta value of the Io due to interference sources. This delta value is subtracted from the total power as measured by the pn-scanner. The resultant is an adjusted Io ($Io^i$). The adjusted $Io^i$ is used to calculate a modified Ec/Io ratio which approximates the signal to power ratio at the CDMA transmission site.

One embodiment of the present invention weights the individual interference components. Weighting is a function of the interference component's frequency location relative to the CDMA channel of interest. For example, the adjacent-channel CDMA or other spread-spectrum signals will be entered in the correction expression with the weight determined during the design or calibration of the measurement scanner. The weight reflects the ratio of the power in the adjacent CDMA frequency channel that leaks into the CDMA channel of interest thus contributing to the growth of the total power (Io).

One embodiment applies weights to discrete interference components dependent on their position proximity to the edge of the CDMA channel of interest bandwidth. Those components well inside the bandwidth that is near the bandwidth center will have unity weight applied to the correction factor. The power of an interference component near the bandwidth edge will be weighted by the measured or theoretical value reflecting that component's contributions to total power (Io). The interference components' power near the bandwidth edges will have less than unity weighting applied. The processor individually calculates the weighting for each interference component.

One embodiment of the present invention reports the corrected Ec/Io ratio to the CDMA carrier. The sources of interference will also be reported. The CDMA carrier will be able to use this report for remedial action.

BRIEF DESCRIPTION OF THE DRAWING

The FIGURE illustrates an overview of the method and apparatus for calculating a corrected CDMA transmission signal to power ratio.

DETAILED DESCRIPTION OF THE INVENTION

According to the invention, the apparatus for evaluating the transmitted Ec/Io value consists of two measurement components and a Digital Signal Processor (DSP) section for data processing. CDMA is a system where a plurality of base stations use the same pn-codes but individually assign initial phases of code sequences, thus allowing for multiple channels to coexist. Each base station transmission has multiple channels including one known as the pilot channel. Other channels include a synchronization channel, paging and traffic channels. One of the measurement components is called the pseudo noise scanner (pn-scanner) and performs a scan of the pilot channel uncorrected for interference. It is assisted by DSP to perform calculations. The resultant ratio (Ec/Io) is used to report the reception quality at a reception location of the CDMA pilot channel. The power value, Io, may be greater at the reception location due to multiple sources of interference. The reception frequency for the CDMA pilot channel being scanned, for purposes of this description, will be referred to as the "CDMA channel of interest".

The second measurement component, called the frequency scanner, which may share functionality with the pn-scanner, performs spectrum measurements on the received signal close in time to when the pn scan data were acquired. For purposes of this description, "close in time" includes "at the same time" as well as "a brief time before or after" the time in question. The results obtained from the frequency scan are used to correct the results for the pn-scan. The frequency scan is set to identify and quantify any interference adjacent and coincident with the CDMA channel of interest. Individual sources of interference as perceived at the receiver are referred to as interference components for purposes of this description. The parameters of adjacent and coincident wideband CDMA signals are identified and measured using simple pattern-recognition techniques. Discrete interference components within the interference bandwidth are also identified and measured. For purposes of this description "interference bandwidth" means the bandwidth adjacent and coincident the CDMA channel of interest. Since measurement occurs at a reception location, "reception interference bandwidth" means the interference bandwidth perceived at a reception location.

Referring to the FIGURE, an overview of the method and apparatus for calculating the corrected CDMA ratio of signal (energy per chip, or Ec) to the power of the transmission of the reception CDMA channel of interest (Io) is illustrated. Multiple RF transmissions 110, 112, 114 are made in parallel from multiple transmission sources. RF1, RF2 and RF3 are of different bandwidths, but are sufficiently close in frequency to cause potential interference. The universe of RF transmissions at an instant of time is represented by "cloud" 116.

For purposes of signal reception quality, the transmission that is being tested for strength of signal relative to overall transmission power is a specific CDMA pilot channel within the RF2 102 frequency. The pn scanner 122 measures and communicates to a DSP 140 the Ec 141 and the Io 142 at a reception location for the CDMA channel of interest. There may be other non-CDMA and CDMA non-pilot transmissions within RF2 frequency that adds to the interference levels.

The CDMA channel of interest 120 is first scanned 122 by a pn-scanner. The scan tests and measures the CDMA pilot channel for propagation and coverage. Part of the measurement is the Ec (signal) and Io (power). The signal will contain extraneous "noise" or interference that is reflected in an overall Io value as communicated to the DSP 140.

A frequency scan 132 of the frequency that being tested as well as adjacent RF frequencies (collectively 130) is next performed. The illustration (FIG. 1) shows the frequency scan 132 as independent from the pn-scan 122. An alternate embodiment combines the PN-scanner and the frequency scanner in a single unit. The frequency scan results are fed to the DSP 140. The DSP 140, in alternative embodiments, is integrated with the pn-scanner 122 or the frequency scanner 132. The DSP 140 may be separate from both scanners and integrated with both scanners. In another embodiment there is a DSP for the frequency scanner as well as another DSP for the pn-scanner.

The DSP 140 uses pattern recognition of the signals received in and around the CDMA channel of interest RF for identification of multiple Io power levels transmissions (characterized in the illustration as $Io_1 \ldots Io_N$) as well as the source of each Io component. The DSP 140, in one embodiment of the present invention, computes an adjustment factor to the Io, $\Delta Io$ 143, equal to the sum of the products of individual interference component power value by a weighting factor for each separate interference component. Adjusted Io 144, is expressed as $Io^i = Io - \Delta Io$.

Depending on the type and frequency offset from the nominal receive frequency (RF2 102) of the identified spectral components, the spectral components are treated in different ways to calculate a correction factor. This correction factor is applied to the CDMA channel of interest's Ec/Io of the pn-scanner receiver 122 to approximate the Ec/Io value for the transmitter. The goal is to correct the value of Io (the total power) to obtain the value that characterizes only the power of the useful spread-spectrum signal ($Io^i$) from the transmitter absent interference.

For example, the adjacent and coincident-channel CDMA or other spread-spectrum signals will be entered in the correction expression with a weight determined during the design or calibration of the measurement apparatus. The weight reflects the ratio of the power in the adjacent and coincident CDMA frequency channel that leaks into the bandwidth of interest and contributes to the increase of the total measured power Io.

The interference components are weighted based on their proximity to the edge of the reception bandwidth. Those interference components at or close to the center of the CDMA channel of interest bandwidth will have unity weight; that is, their total power will be added. Those interference components with frequencies near the CDMA channel of interest reception bandwidth edges will be multiplied by the measured or theoretical value of the frequency response of the reception channel to provide their contribution to Io power. The cumulative interference correction factor is referred to as $\Delta Io$. The weighted correction formula for one embodiment is given supra.

After the correction to Io has been determined in the described manner, it is applied to the previously measured value Io to yield the corrected value 144:

$$Io^i = Io - \Delta Io,$$

where $Io^i$ is the adjusted Io for the transmitter.

Using the previously found values of Ec and Io the corrected value of the CDMA channel of interest, Ec/Io is calculated 145 by the DSP:

$$(Ec/Io)^{corr} = (Ec/Io) * (Io/Io^i)$$

where the corrected value approximates the Ec/Io value at the transmission site.

The corrected results according to the present invention allow an assessment of the quality of the base-station signal independently of the locally present interference at the reception site. The traditional (uncorrected) and the described corrected values of Ec/Io for the given pilot signal characteristic propagation, interference, and transmitter parameters individually can be used together, thus providing another benefit of the invention disclosed herein.

An additional benefit of the present invention is that by combining frequency-scan and pn-scan data in the analysis, any harmful interference existing in the vicinity of the CDMA channel may be identified and reported together with the pn-scan results. One embodiment of the present invention reports 146 Ec/Io results and identification of harmful interference. The CDMA carrier may use the report 146 for remedial action.

It will be apparent to those skilled in the art that other variations in, for example and without limitation, the DSP can be remote from the scanners and the computation of adjusted Ec/Io can be taken over time. Interference components can be simulated so as to refine the adjustment factors. An estimate of the Ec/Io ratio at the transmission site can be made without departing from the scope of the invention as disclosed.

What is claimed is:

1. A method for calculating CDMA transmission signal propagation and coverage, the method comprising:

measuring a reception signal value of a CDMA channel of interest as measured at a reception location wherein the CDMA transmission is done at a transmission site;

measuring at the reception location a first reception total power value of the CDMA channel of interest;

measuring a second reception power value of the CDMA channel of interest;

removing the second reception power value from the first reception total power value to arrive at an adjusted total power value; and calculating an adjusted signal to total power ratio using the reception signal value of the CDMA channel of interest divided by the adjusted total power value, the adjusted signal to total power ratio representing an approximation of a signal to total power ratio of the CDMA transmission at the transmission site.

2. The method for calculating CDMA transmission signal propagation and coverage of claim 1, wherein the second reception power value comprises summing a separate interference power value for any interference component detected.

3. The method for calculating CDMA transmission signal propagation and coverage of claim 2, wherein measuring the second reception power value comprises measuring in a reception interference bandwidth.

4. The method for calculating CDMA transmission signal propagation and coverage of claim 3, wherein measuring the second reception power value comprises scanning with a frequency scanner.

5. The method for calculating CDMA transmission signal propagation and coverage of claim 4, the method further comprising:

measuring the second reception power value close in time to the measuring of the first reception total power value.

6. The method for calculating CDMA transmission signal propagation and coverage of claim 2, the method further comprising:

measuring a spectrum in the reception interference bandwidth;

analyzing the spectrum measured;

identifying a source for any interference components detected; and identifying a separate interference power value for each interference component detected.

7. The method for calculating CDMA transmission signal propagation and coverage of claim 6, wherein measuring the spectrum comprises making a frequency scan.

8. The method for calculating CDMA transmission signal propagation and coverage of claim 7, the method further comprising:

applying pattern-recognition techniques to identify and measure each interference component detected.

9. The method for calculating CDMA transmission signal propagation and coverage of claim 6, the method further comprising:

reporting the adjusted signal to total power ratio;

reporting the source for any interference components detected; and reporting the separate interference power value for each interference component detected.

10. The method for calculating CDMA transmission signal propagation and coverage of claim 6, the method further comprising:

reporting the second adjusted signal to total power ratio;

reporting the source for any interference components detected; and reporting the separate interference power value for each interference component detected.

11. The method for calculating CDMA transmission signal propagation and coverage of claim 6, the method further comprising:

calculating a first signal to total power ratio by dividing the reception signal value by the first reception total power value;

expressing the first signal to total power ratio as an Ec/Io value;

calculating a second signal to total power ratio, said second signal to power ratio calculated using the adjusted total power value; and expressing the signal to total power second ratio as an adjusted Ec/Io value, said adjusted Ec/Io value approximating the CDMA pilot channel's Ec/Io at the transmission location.

12. The method for calculating CDMA transmission signal propagation and coverage of claim 11, wherein calculating the first signal to power ratio and calculating the second signal to power ratio comprises calculating using a digital signal processor.

13. The method for calculating CDMA transmission signal propagation and coverage of claim 6, the method further comprising:

calculating a separate interference weighting for each interference component detected;

calculating an adjusted second reception power value comprising calculating a sum of the products of the separate interference power value by the separate interference weighting for each interference component detected;

removing the adjusted second reception power value from the first reception total power value to arrive at a second adjusted total power value; and calculating a second adjusted signal to total power ratio using the reception signal value of the CDMA channel of interest divided by the second adjusted total power value.

14. The method for calculating CDMA transmission signal propagation and coverage of claim 13, wherein the calculating a separate interference weighting for each interference component detected further comprises:

identifying the frequency of each interference component detected;

assigning a unity weighting for each interference component detected whose frequency is approximately coincident to the CDMA channel of interest; and assigning less than a unity weighting each interference component detected whose frequency is not approximately coincident to the CDMA channel of interest.

15. The method for calculating CDMA transmission signal propagation and coverage of claim 1, the method further comprising:

reporting the adjusted signal to total power ratio.

16. The method for calculating CDMA transmission signal propagation and coverage of claim 1, wherein measuring the reception signal value and measuring the first total power value comprises scanning the CDMA channel of interest with a pseudo noise scanner.

17. The method for calculating CDMA transmission signal propagation and coverage of claim 16, wherein the scanning the CDMA channel of interest comprises scanning a CDMA pilot channel.

18. An apparatus for calculating CDMA transmission signal propagation and coverage, the apparatus comprising:

a scanner for measuring a reception signal value of a CDMA channel of interest as measured at a reception location wherein the CDMA transmission is done at a transmission site;

a scanner for measuring at the reception location a first reception total power value of the CDMA channel of interest;

a scanner for measuring a second reception power value of the CDMA channel of interest;

logic for removing the second reception power value from the first reception total power value to arrive at an adjusted total power value; and logic for calculating an adjusted signal to total power ratio using the reception signal value of the CDMA channel of interest divided by the adjusted total power value, the adjusted signal to total power ratio representing an approximation of a signal to total power ratio of the CDMA transmission at the transmission site.

19. The apparatus for calculating CDMA transmission signal propagation and coverage of claim 18, wherein the scanner for measuring the second reception power value further comprises logic for summing a separate interference power value for any interference component detected.

20. The apparatus for calculating CDMA transmission signal propagation and coverage of claim 19, wherein the scanner for measuring the second reception power value further comprises logic for scanning in a reception interference bandwidth.

21. The apparatus for calculating CDMA transmission signal propagation and coverage of claim 20, wherein the scanner for measuring the second reception power value comprise a frequency scanner.

22. The apparatus for calculating CDMA transmission signal propagation and coverage of claim 21, wherein the second reception power value measuring is done close in time to the first reception total power value measuring.

23. The apparatus for calculating CDMA transmission signal propagation and coverage of claim 19, the apparatus further comprising:
- logic for measuring a spectrum in the reception interference bandwidth;
- logic for analyzing the spectrum measured;
- logic for identifying a source for any interference components detected; and
- logic for identifying a separate interference power value for each interference component detected.

24. The apparatus for calculating CDMA transmission signal propagation and coverage of claim 23, wherein the scanner for measuring the spectrum comprises a frequency scanner.

25. The apparatus for calculating CDMA transmission signal propagation and coverage of claim 24, further comprising logic for applying pattern-recognition techniques to identify and measure each interference component detected.

26. The apparatus for calculating CDMA transmission signal propagation and coverage of claim 23, the apparatus further comprising:
- a report for reporting the adjusted signal to total power ratio;
- a report for reporting the source for any interference components detected; and
- a report for reporting the separate interference power value for each interference component detected.

27. The apparatus for calculating CDMA transmission signal propagation and coverage of claim 23, the apparatus further comprising:
- a report for reporting the second adjusted signal to total power ratio;
- a report for reporting the source for any interference components detected; and
- a report for reporting the separate interference power value for each interference component detected.

28. The apparatus for calculating CDMA transmission signal propagation and coverage of claim 23, the apparatus further comprising:
- logic for calculating a first signal to total power ratio by dividing the reception signal value by the first reception total power value;
- logic for expressing the first signal to total power ratio as an Ec/Io value;
- logic for calculating a second signal to total power ratio, said second signal to power ratio calculated using the adjusted total power value; and
- logic for expressing the signal to total power second ratio as an adjusted Ec/Io value, said adjusted Ec/Io value approximating the CDMA pilot channel's Ec/Io at the transmission location.

29. The apparatus for calculating CDMA transmission signal propagation and coverage of claim 28, the apparatus further comprising:
- a digital signal processor comprising the logic for calculating the first signal to power ratio and the logic for calculating the second signal to power ratio.

30. The apparatus for calculating CDMA transmission signal propagation and coverage of claim 23, the apparatus further comprising:
- logic for calculating a separate interference weighting for each interference component detected;
- logic for calculating an adjusted second reception power value comprising the sum of the products of the separate interference power value by the separate interference weighting for each interference component detected;
- removing the adjusted second reception power value from the first reception total power value to arrive at an second adjusted total power value; and
- calculating a second adjusted signal to total power ratio using the reception signal value of the CDMA channel of interest divided by the second adjusted total power value.

31. The apparatus for calculating CDMA transmission signal propagation and coverage of claim 30, wherein the logic for calculating a separate interference weighting for each interference component detected further comprising:
- logic for identifying the frequency of each interference component detected;
- logic for assigning a unity weighting for each interference component detected whose frequency is approximately coincident to the CDMA channel of interest; and
- logic for assigning less than a unity weighting each interference component detected whose frequency is not approximately coincident to the CDMA channel of interest.

32. The apparatus for calculating CDMA transmission signal propagation and coverage of claim 18, the apparatus further comprising:
- a report for reporting the adjusted signal to total power ratio.

33. The apparatus for calculating CDMA transmission signal propagation and coverage of claim 18, wherein the scanner for measuring the reception signal value and measuring the first total power value comprises a pseudo noise scanner.

34. The apparatus for calculating CDMA transmission signal propagation and coverage of claim 33, wherein the pseudo noise scanner scans a CDMA pilot channel.

* * * * *